United States Patent
Nogawa

(10) Patent No.: US 9,535,639 B2
(45) Date of Patent: Jan. 3, 2017

(54) COMMUNICATION APPARATUS

(71) Applicant: BROTHER KOGYO KABUSHIKI KAISHA, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/008,897

(22) Filed: Jan. 28, 2016

(65) Prior Publication Data

US 2016/0224288 A1  Aug. 4, 2016

(30) Foreign Application Priority Data

Jan. 30, 2015 (JP) ................................. 2015-017497

(51) Int. Cl.
  *H04N 1/04* (2006.01)
  *G06F 3/12* (2006.01)
(52) U.S. Cl.
  CPC ........... *G06F 3/1236* (2013.01); *G06F 3/1203* (2013.01); *G06F 3/1253* (2013.01)
(58) Field of Classification Search
  CPC ..... G06F 3/1236; G06F 3/1203; G06F 3/1253
  USPC .............................. 358/1.15, 1.14, 1.13, 1.9
  See application file for complete search history.

(56) References Cited

U.S. PATENT DOCUMENTS

| 2014/0092776 A1* | 4/2014 | Shibata ................. H04W 84/18 370/254 |
| 2014/0200426 A1* | 7/2014 | Taub ................... A61B 5/14532 600/347 |
| 2014/0268236 A1 | 9/2014 | Ohara et al. |
| 2016/0014281 A1* | 1/2016 | Ichiyama ........... H04N 1/00127 358/1.15 |

FOREIGN PATENT DOCUMENTS

JP          2014179017 A       9/2014

* cited by examiner

*Primary Examiner* — Houshang Safaipour
(74) *Attorney, Agent, or Firm* — Scully, Scott, Murphy & Presser, PC

(57) ABSTRACT

A communication apparatus includes a display, a processor and a memory storing instructions which, when executed by the processor, cause the communication apparatus to perform receiving a first request for acquiring acquisition target information included in the communication apparatus, determining whether the first request is received from a server apparatus outside of a local area network or a terminal apparatus belonging to the local area network, displaying a transmission selection screen for receiving a user's selection when the first request is determined to be received from the server apparatus, transmitting the acquisition target information to the server apparatus in response to receiving the user's selection to transmit the acquisition target information through the transmission selection screen, and transmitting the acquisition target information to the terminal apparatus when the first request is determined to be received from the terminal apparatus.

14 Claims, 11 Drawing Sheets

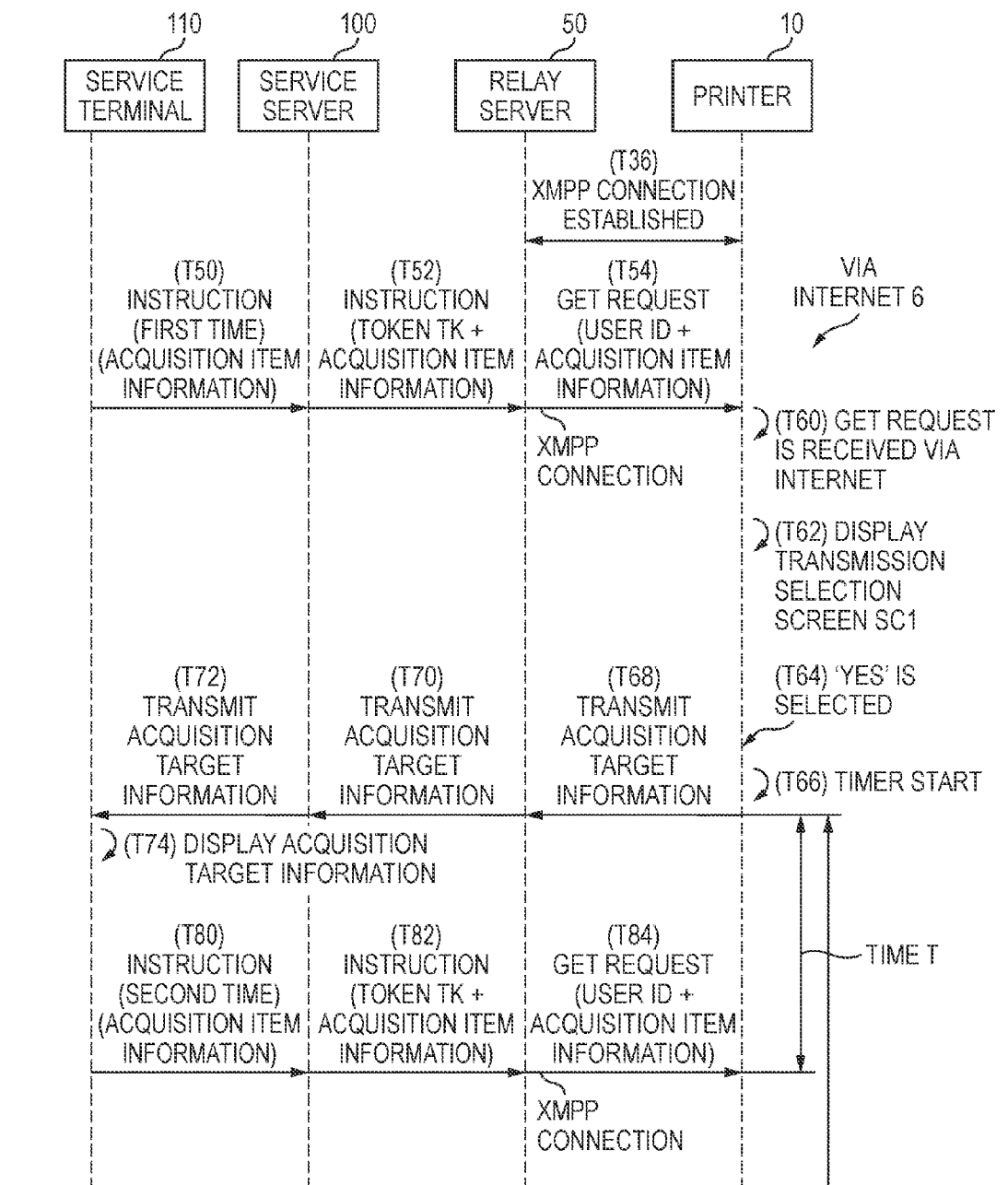

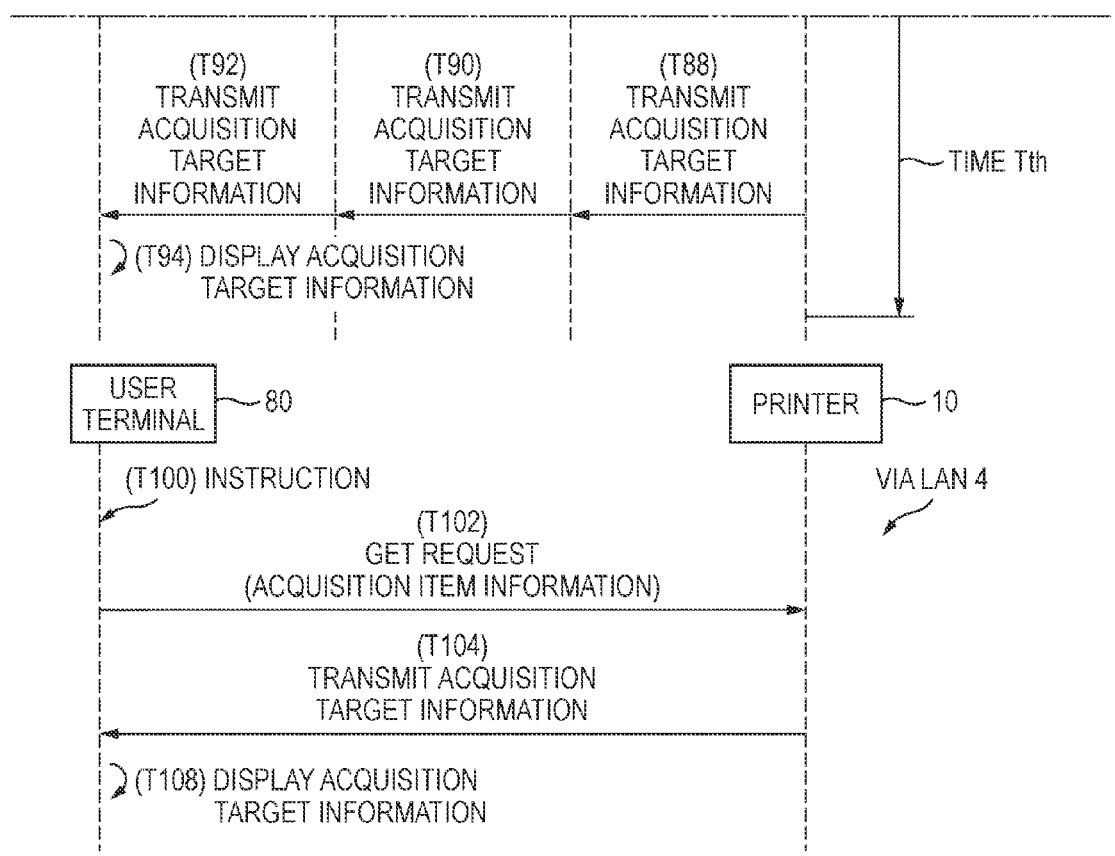

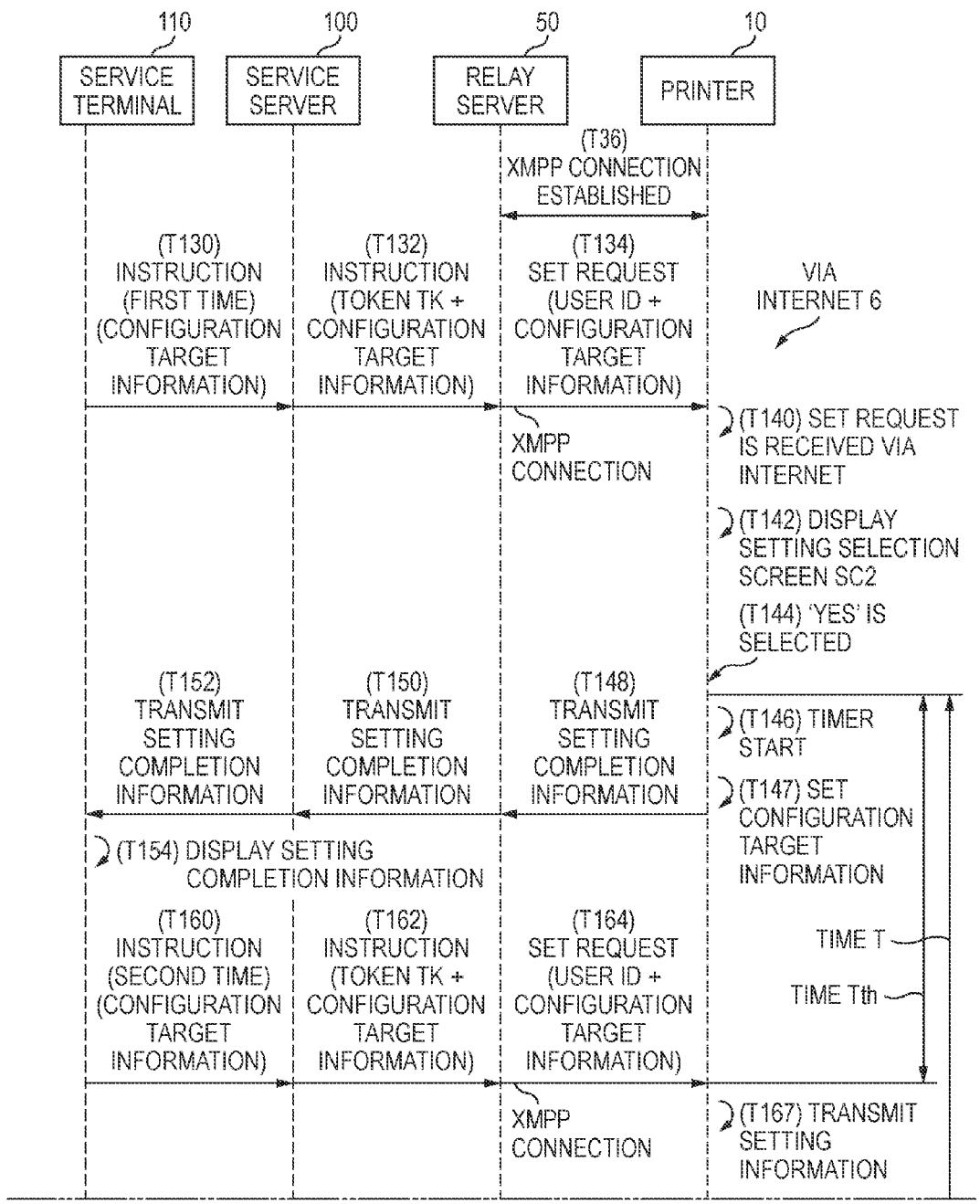

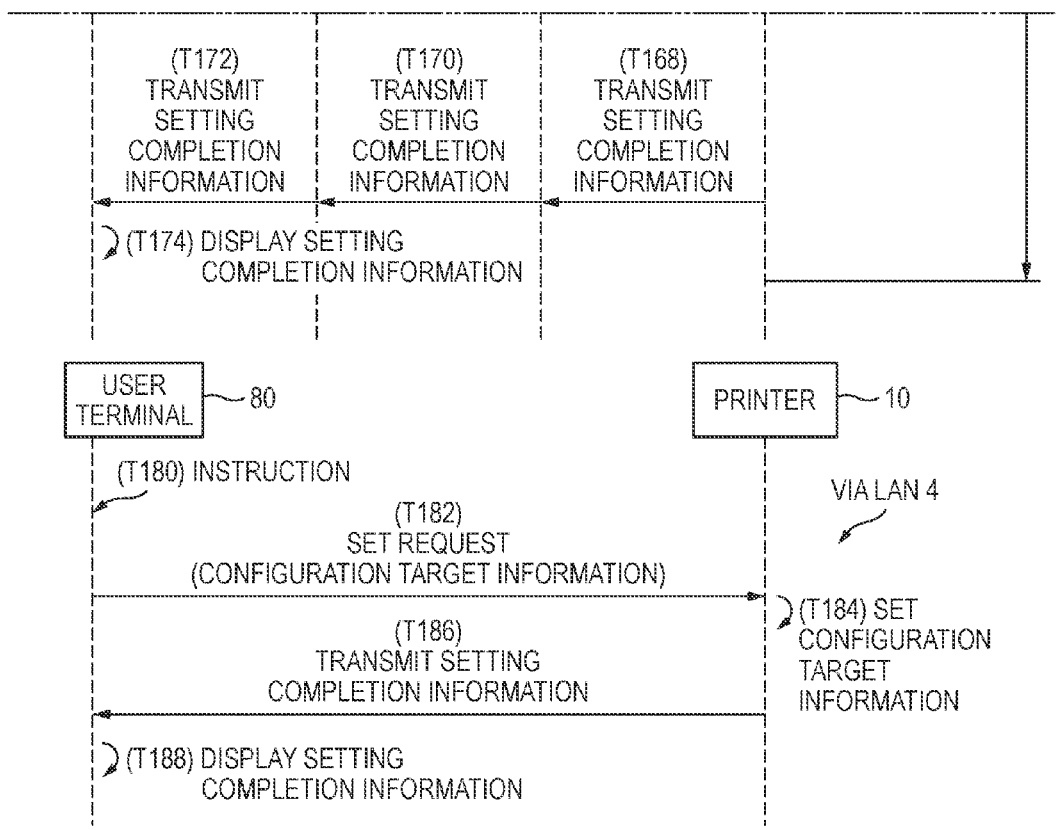

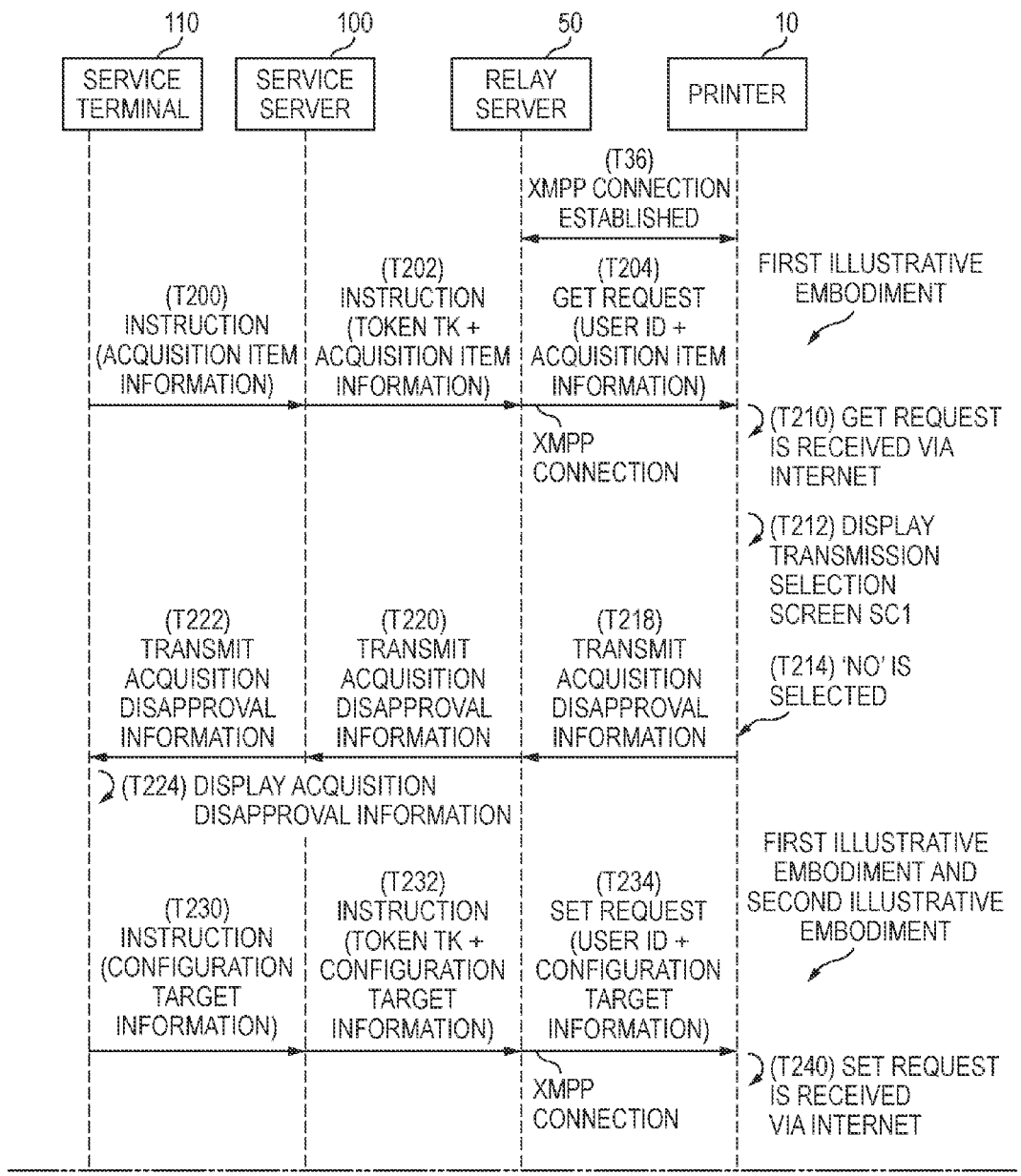

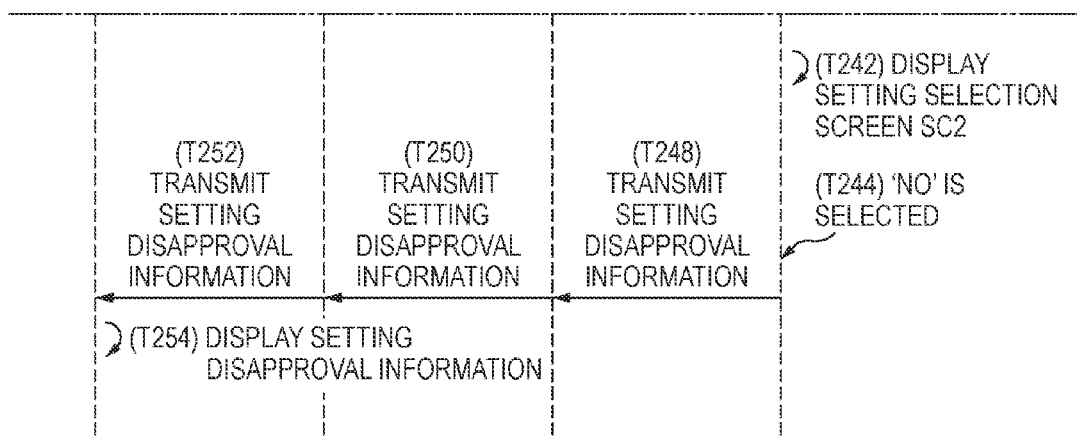

COMMUNICATION APPARATUS

CROSS-REFERENCE TO RELATED APPLICATION

This application claims priority from Japanese Patent Application No. 2015-017497 filed on Jan. 30, 2015, the entire subject-matter of which is incorporated herein by reference.

TECHNICAL FIELD

The disclosure relates to a communication apparatus capable of performing communication with each of a server apparatus outside of a local area network to which the communication apparatus belongs, and a terminal apparatus belonging to the same network as the local area network.

BACKGROUND

There has been disclosed an image processing apparatus configured to connect to a server through the Internet. For maintenance and inspection of the image processing apparatus, the image processing apparatus is configured to transmit information in the image processing apparatus to the server.

SUMMARY

According to one illustrative aspect of the disclosure, there may be provided a communication apparatus comprising: a display; a processor; and a memory storing instructions which, when executed by the processor, cause the communication apparatus to perform: receiving a first request for acquiring acquisition target information, the acquisition target information included in the communication apparatus; determining whether the first request is received from a server apparatus outside of a local area network, to which the communication apparatus belongs, or a terminal apparatus belonging to the local area network; controlling the display to display a transmission selection screen for receiving a user's selection whether or not to transmit the acquisition target information, when it is determined that the first request is received from the server apparatus; controlling the display not to display the transmission selection screen, when it is determined that the first request is received from the terminal apparatus; transmitting the acquisition target information to the server apparatus, in response to receiving the user's selection to transmit the acquisition target information through the transmission selection screen when it is determined that the first request is received from the server apparatus; not transmitting the acquisition target information to the server apparatus, in response to receiving the user's selection not to transmit the acquisition target information through the transmission selection screen when it is determined that the first request is received from the server apparatus; and transmitting the acquisition target information to the terminal apparatus, when it is determined that the first request is received from the terminal apparatus. Since the server apparatus outside of the local area network to which the communication apparatus belongs is not usually an apparatus that is provided by a manager of the local area network, it is not clear whether the server apparatus is an apparatus having high reliability. Considering this situation, when the first request is received from the server apparatus, the communication apparatus displays the transmission selection screen, and changes whether or not to transmit the acquisition target information to the server apparatus, depending on a user's selection result. When the user does not want to transmit the acquisition target information in response to the first request from the server apparatus, the acquisition target information is not transmitted to the server apparatus, so that the security of the communication apparatus can be improved. On the other hand, the terminal apparatus within the local area network to which the communication apparatus belongs is usually an apparatus that is provided by the manager of the local area network and has high reliability. Considering this situation, when the first request is received from the terminal apparatus, the communication apparatus transmits the acquisition target information to the terminal apparatus without displaying the transmission selection screen. In this way, since the user does not have to make a selection through the transmission selection screen, the user's convenience is improved.

According to another illustrative aspect of the disclosure, there may be provided a communication apparatus comprising: a display; a processor; and a memory storing instructions which, when executed by the processor, causes the communication apparatus to perform operations comprising: receiving a first request for setting configuration target information into the communication apparatus; determining whether the first request is received from a server apparatus outside of a local area network, to which the communication apparatus belongs, or a terminal apparatus belonging to the local area network; controlling the display to display a setting selection screen for receiving a user's selection whether or not to set the configuration target information, when it is determined that the first request is received from the server apparatus; controlling the display not to display the setting selection screen, when it is determined that the first request is received from the terminal apparatus; setting the configuration target information into the communication apparatus, in response to receiving the user's selection to set the configuration target information through the setting selection screen when it is determined that the first request is received from the server apparatus; not setting the configuration target information into the communication apparatus, in response to receiving the user's selection not to set the configuration target information through the setting selection screen when it is determined that the first request is received from the server apparatus; and setting the configuration target information into the communication apparatus, when it is determined that the first request is received from the terminal apparatus.

According to the above configuration, when the first request is received from the server apparatus, the communication apparatus displays the setting selection screen and changes whether or not to set the configuration target information into the communication apparatus, depending on a user's selection result. When the user does not want to set the configuration target information in response to the first request from the server apparatus, the configuration target information is not set into the communication apparatus, so that the security of the communication apparatus can be improved. On the other hand, when the first request is received from the terminal apparatus, the communication apparatus sets the configuration target information into the communication apparatus without displaying the setting selection screen. In this way, since the user does not have to make a selection through the setting selection screen, the user's convenience is improved.

A control method and a computer program for implementing the communication apparatus, and a computer-readable storage medium having the computer program stored therein are also novel and useful.

BRIEF DESCRIPTION OF THE DRAWINGS

FIGS. 5A and 5B depict a case where acquisition target information is transmitted in response to a GET request;

FIGS. 6A and 6B depict a case where configuration target information is set in response to a SET request;

FIGS. 7A and 7B depict a case where not to respond to the GET request and a case where not to respond to the SET request.

DETAILED DESCRIPTION

In the related-art technology, the image processing apparatus is configured to necessarily transmit the information in the image processing apparatus, in response to a request from the server. According to this configuration, the security of the image processing apparatus may be lowered. Therefore, illustrative aspects of the disclosure provide a technology capable of improving the security of a communication apparatus.

First Illustrative Embodiment

Figure 1:
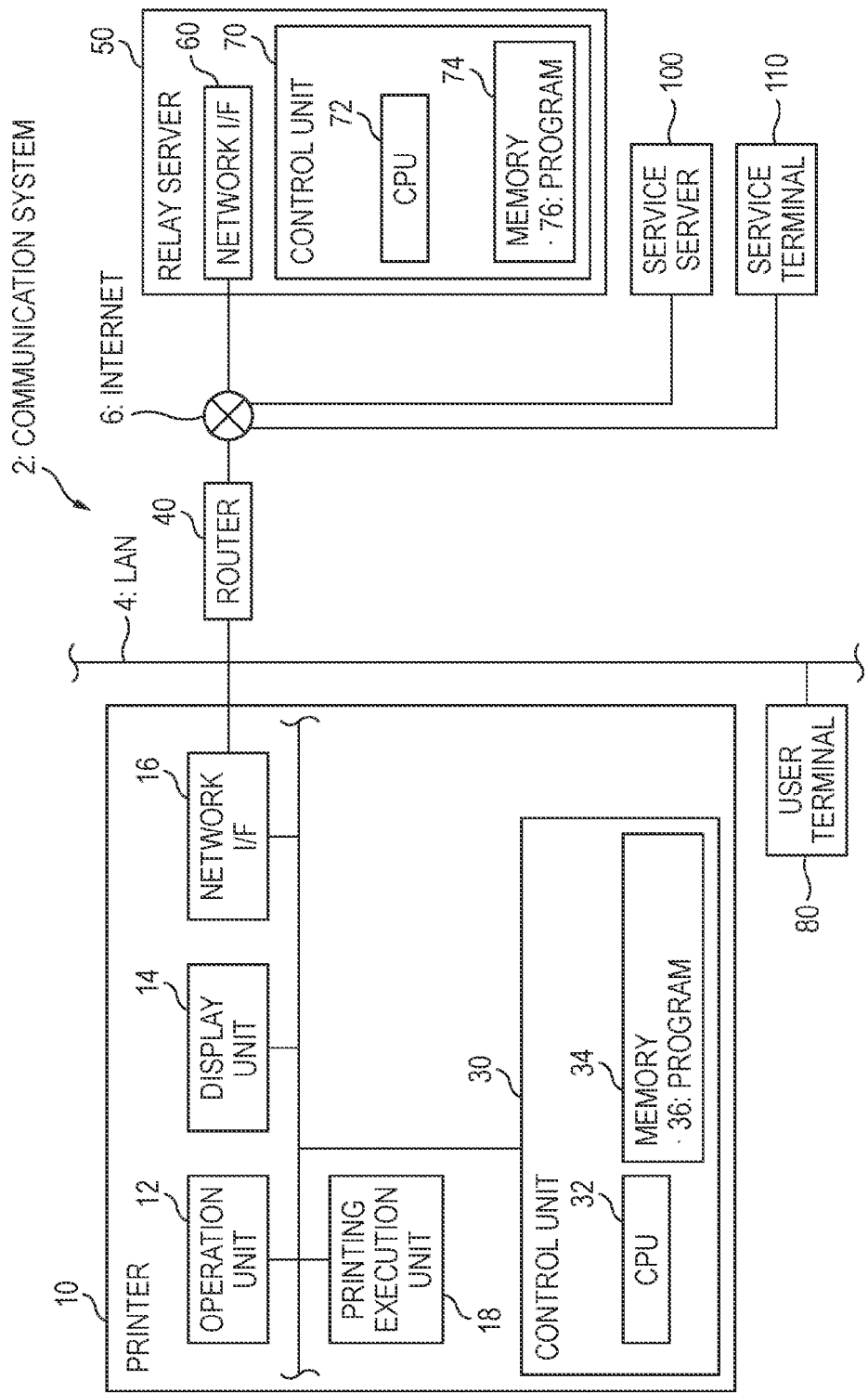
FIG. 1 depicts a configuration of a communication system.

Configuration of Communication System 2; FIG. 1

A communication system 2 includes a printer 10, a relay server 50, a user terminal 80, a service server 100, and a service terminal 110. The printer 10 and the user terminal 80 belong to the same local area network 4 (hereinafter, referred to as LAN (abbreviation of Local Area Network) 4). Therefore, the printer 10 can perform communication with the user terminal 80 through the LAN 4, without via the Internet 6. The relay server 50 does not exist in the LAN 4, to which the printer 10 belongs, and is provided on the Internet 6. Therefore, the printer 10 can perform communication with the relay server 50 through the LAN 4 and the Internet 6. Also, the service server 100 does not exist in the LAN 4 and is provided on the Internet 6. The relay server 50 and the service server 100 can perform communication with each other through the Internet 6. The service terminal 110 belongs to a LAN (not shown) different from the LAN 4. The service server 100 and the service terminal 110 can perform communication with each other through the LAN and the Internet 6.

(Configuration of Printer 10)

The printer 10 is a peripheral device of the user terminal 80 existing in the LAN 4, and has an operation unit 12, a display unit 14, a network I/F (abbreviation of Interface) 16, a printing execution unit 18, and a control unit 30.

The operation unit 12 has a plurality of keys. A user can input a variety of instructions to the printer 10 by operating the operation unit 12. The display unit 14 is a display for displaying a variety of information. The display unit 14 is configured to function as a so-called touch panel. That is, the display unit 14 is further configured to function as the operation unit to be operated by the user. The network I/F 16 is an interface for connecting the printer 10 to the LAN 4. The network I/F 16 may be an interface for performing wired communication or an interface for performing wireless communication. That is, the LAN 4 may be a wired LAN or a wireless LAN. In the meantime, a router 40 is mounted in the LAN 4. The router 40 is configured to relay communication between a device (for example, the printer 10) within the LAN 4 and a device (for example, the relay server 50) outside of the LAN 4. The printing execution unit 18 has a printing mechanism of an inkjet mode or a laser mode. The control unit 30 has a CPU 32 and a memory 34. The CPU 32 is configured to execute a variety of processing, in response to a program 36 stored in the memory 34. The memory 34 is a RAM, a ROM and the like, for example.

(Configuration of Relay Server 50)

The relay server 50 is a server configured to relay communication between the printer 10 and the service server 100, and is provided on the Internet 6 by a vendor of the printer 10. The relay server 50 has a network I/F 60 and a control unit 70. The network I/F 60 is an interface for connecting the relay server 50 to the Internet 6. The control unit 70 has a CPU 72 and a memory 74. The CPU 72 is configured to execute a variety of processing, in response to a program 76 stored in the memory 74. The memory 74 is a RAM, a ROM and the like, for example.

(Configurations of Other Devices 80, 100, 110)

The user terminal 80 is a terminal mounted in the LAN 4 by a manager of the LAN 4, and includes a PC (abbreviation of Personal Computer), a mobile phone, a smart phone, a tablet terminal and the like. The service server 100 is a server that is mounted in a call center providing the user of the printer 10 with a call service. The call service is a service for receiving a call from a user and replying to an answer relating to the printer 10. The service terminal 110 is a terminal that is to be operated by an operator of the call center.

(Outline of Communication System 2)

In this illustrative embodiment, a situation is assumed in which when an operator of the call center receives a call from the user of the printer 10, the operator uses the service terminal 110. A situation is particularly assumed in which the service terminal 110 transmits a GET request and a SET request to the printer 10 through the service server 100 and the relay server 50, in response to an instruction from the operator. For example, when the service terminal 110 transmits an instruction for acquiring information in the printer 10 to the service server 100, the instruction is transmitted from the service server 100 to the relay server 50, and a GET request is transmitted from the relay server 50 to the printer 10. Thereby, the service terminal 110 can acquire the information from the printer 10 and thus can display the information. As a result, the operator can know about the contents of the information without asking the user about the contents of the information through a call. Also, for example, when the service terminal 110 transmits an instruction for setting the information into the printer 10 to the service server 100, the instruction is transmitted from the service server 100 to the relay server 50, and a SET request is transmitted from the relay server 50 to the printer 10. Thereby, the service terminal 110 can set the information into the printer 10. As a result, the user of the printer 10 does not have to execute an operation of setting the information into the printer 10. Also, when the printer 10 receives the GET request or the SET request from the user terminal 80 through the LAN 4, the printer can transmit the information in the printer 10 or set the information into the printer 10.

Figure 2:
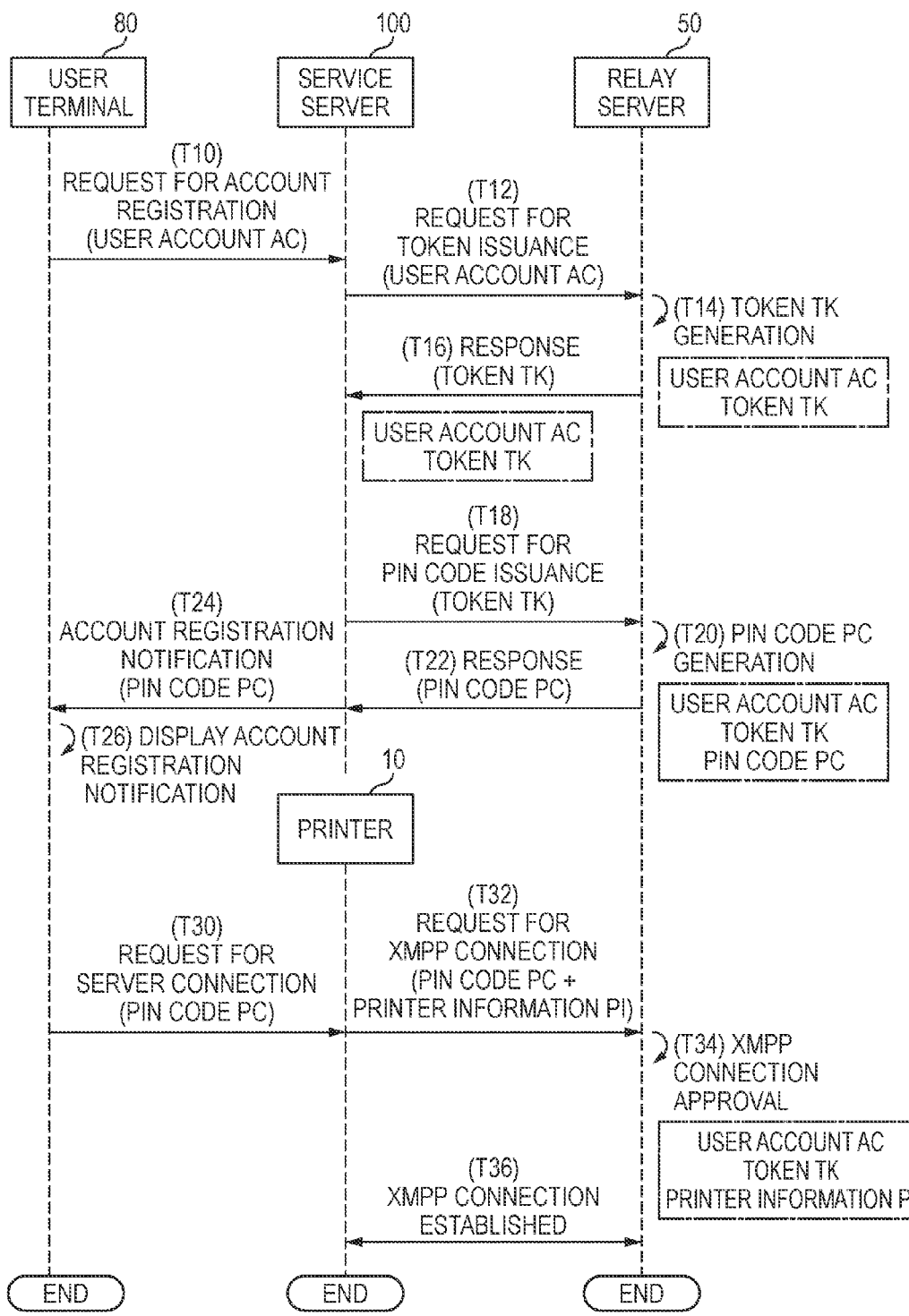
FIG. 2 depicts a sequence diagram of each processing for establishing XMPP connection between a printer and a relay server.

(Each Processing for Establishing XMPP Connection; FIG. 2)

Subsequently, each processing for establishing XMPP (abbreviation of eXtensible Messaging and Presence Protocol) connection between the printer 10 and the relay server 50 is described with reference to FIG. 2. As described above, in this illustrative embodiment, the GET request or the SET request can be transmitted from the relay server 50 to the printer 10. At this time, the relay server 50 transmits the request to the printer 10 through the Internet 6. In particular, instead of receiving any instruction from the printer 10 and transmitting a request as a response to the instruction to the printer 10, the relay server 50 transmits the request to the printer 10 without receiving an instruction from the printer 10. The LAN 4 usually has a fire wall (i.e., the router 40) for restricting an illegal access from the Internet 6, for example. For this reason, in order for the printer 10 to receive a request from the relay server 50 through the Internet 6, it is necessary to establish in advance XMPP connection referred to as always-on connection between the relay server 50 and the printer 10 before the relay server 50 receives an instruction for transmission of the request from the service server 100. Thereby, the printer 10 can receive the request from the relay server 50 through the Internet 6 by using the XMPP connection, without transmitting any instruction to the relay server 50.

In T10, the user terminal 80 transmits a request for account registration, which includes a user account AC determined by the user, to the service server 100, in response to an instruction from the user. The request for account registration is a command for requesting the service server 100 to register the user account AC including a user ID and a password. Thereby, the user account AC is registered in the service server 100.

When the user account AC is registered, the service server 100 transmits a request for token issuance including the user account AC to the relay server 50, in T12. The request for token issuance is a command for requesting the relay server 50 to issue a token. The token is authentication information for using the relay server 50.

When the request for token issuance is received from the service server 100, the CPU 72 of the relay server 50 generates a token TK, in T14. The CPU 72 associates and stores the user account AC and the token TK in the memory 74. Meanwhile, a box shown with a dashed-dotted line indicates that the information in the box is associated and registered. Then, in T16, the CPU 72 transmits a response including the token TK to the service server 100.

When the response is received from the relay server 50, the service server 100 associates the token TK in the response with the user account AC and registers the same in the service server 100. Then, in T18, the service server 100 transmits a request for PIN code issuance including the token TK to the relay server 50. The request for PIN code issuance is a command for requesting the relay server 50 to issue a PIN code. The PIN code is information that should be received from the printer 10 so as for the relay server 50 to establish the XMPP connection between the relay server 50 and the printer 10.

When the request for PIN code issuance is received from the service server 100, the CPU 72 of the relay server 50 generates a PIN code PC and registers the PIN code PC in the memory 74 in association with the token TK in the request for PIN code issuance, in T20. Thereby, the user account AC, the token TK and the PIN code PC are associated in the memory 74. Then, in T22, the CPU 72 transmits a response including the PIN code PC to the service server 100.

When the response is received from the relay server 50, the service server 100 transmits an account registration notification including the PIN code PC in the response to the user terminal 80, in T24. The account registration notification is a notification indicating that the registration of the user account AC corresponding to the request for account registration of T10 has been completed.

When the account registration notification is received from the service server 100, the user terminal 80 displays the account registration notification in T26. Thereby, the user can know about the PIN code PC in the account registration notification.

Then, in 130, the user terminal 80 transmits a request for server connection including the PIN code PC, which is input by the user, to the printer 10. The request for server connection is a command for requesting the printer 10 to establish the XMPP connection.

When the request for server connection is received from the user terminal 80, the CPU 32 of the printer 10 transmits a request for XMPP connection to the relay server 50, in T32. The request for XMPP connection is a command for requesting the relay server 50 to establish the XMPP connection. The request for XMPP connection includes the PIN code PC in the request for server connection and printer information PI stored in advance in the memory 34 of the printer 10. The printer information PI is an ID (abbreviation of Identification) for identifying the printer 10.

When the request for XMPP connection is received from the printer 10, the CPU 72 of the relay server 50 performs authentication for the PIN code PC in the request for XMPP connection. When the PIN code PC is registered in the memory 74, the CPU 72 determines that the authentication for the PIN code PC is successful, and when the PIN code PC is not registered in the memory 74, the CPU 72 determines that the authentication for the PIN code PC fails. In the example of FIG. 2, in T34, the CPU 72 determines that the authentication for the PIN code PC is successful, and determines to approve establishment of the XMPP connection. At this time, the CPU 72 deletes the PIN code PC from the memory 74, and registers the printer information PI of the request for XMPP connection in the memory 74. Thereby, the user account AC, the token TK and the printer information PI are associated in the memory 74.

Then, in T36, the XMPP connection is established between the printer 10 and the relay server 50. That is, the CPU 32 of the printer 10 establishes the XMPP connection with the relay server 50. Also, the CPU 72 of the relay server 50 establishes the XMPP connection with the printer 10, i.e., the XMPP connection corresponding to the printer information PI. Therefore, at this time, when receiving the instruction including the token TK, the CPU 72 specifies the printer information PI registered with being associated with the token TK, and can transmit the GET request or the SET request to the printer 10 by using the XMPP connection corresponding to the specified printer information PI.

Figure 3:
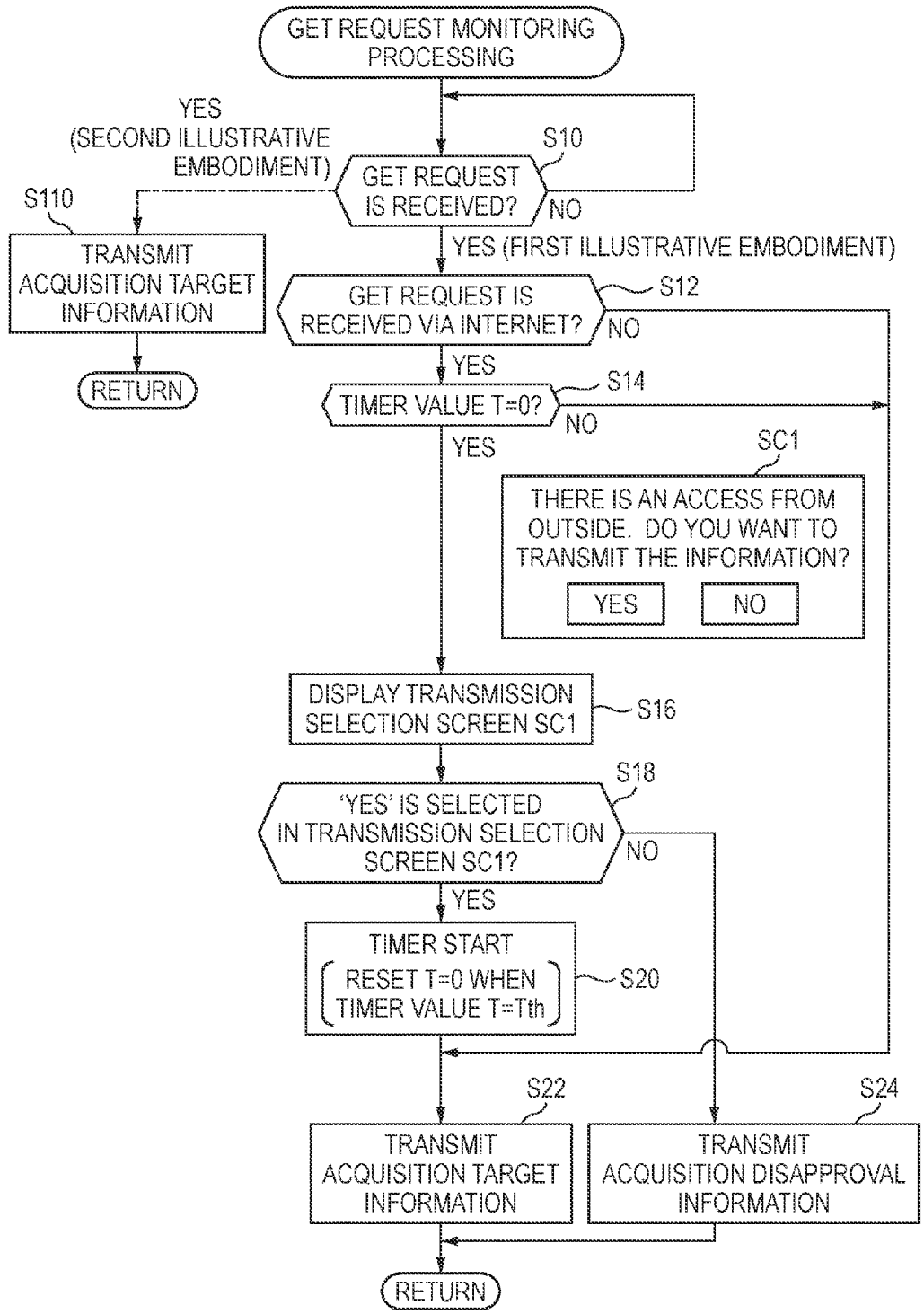
FIG. 3 is a flowchart of GET request monitoring processing.

(GET Request Monitoring Processing; FIG. 3)

Subsequently, GET request monitoring processing that is to be executed by the CPU 32 of the printer 10 is described with reference to FIG. 3. Briefly describing the GET request monitoring processing, the CPU 32 of the printer 10 receives a GET request for acquiring the information in the printer 10 from the relay server 50 or the user terminal 80, and transmits the information in the printer 10 to the relay server 50 or the user terminal 80. In particular, the CPU 32 transmits information, which corresponds to an item indicated by acquisition item information in the GET request, to the relay server 50 or the user terminal 80. The acquisition item information indicates an error hysteresis of the printer 10, a remaining amount of a disposable of the printer 10 and the like, for example. In the below, the information (for example, the error hysteresis information, the information indicative of the remaining amount of the disposable, and the like) corresponding to an item indicated by the acquisition item information is referred to as 'acquisition target information.' Also, an apparatus of a transmission source of the GET request is referred to as 'transmission source apparatus.'

In S10, the CPU 32 monitors whether a GET request is received from the transmission source apparatus. When a GET request is received from the transmission source apparatus (YES in S10), the CPU 32 proceeds to S12.

In S12, the CPU 32 determines whether the GET request is received from the relay server 50 through the Internet 6 or is received from the user terminal 80 without via the Internet 6. More specifically, the CPU 32 determines whether the GET request is received from the relay server 50 through the Internet 6 and the LAN 4 or is received from the user terminal 80 through the LAN 4 without via the Internet 6. Specifically, the CPU 32 executes the determination of S12, based on a type of the protocol of the GET request. When the GET request is a command conforming to the XMPP, i.e., the GET request is received using a port for communication through the XMPP connection, the CPU 32 determines that the GET request is received from the relay server 50 through the Internet 6 (YES in S12), and proceeds to S14. On the other hand, when the GET request is a command conforming to a protocol different from the XMPP, i.e., the GET request is received without using the port, the CPU 32 determines that the GET request is received from the user terminal 80 without via the Internet 6 (NO in S12), skips over S14 to S20 and proceeds to S22. The different protocol is HTTP (abbreviation of Hyper Text Transfer Protocol), SNMP (abbreviation of Simple Network Management Protocol), and the like, for example.

In S14, the CPU 32 determines whether a timer value T is zero or not. The timer is a timer configured to start a count in S20 (which will be described later), and more specifically, a timer configured to count a predetermined time period after 'Yes' is selected in a transmission selection screen. When it is determined that the timer value T is zero (YES in S14), the CPU 32 proceeds to S16, and when it is determined that the timer value T is not zero (NO in S14), the CPU 32 skips over S16 to S20 and proceeds to S22.

In S16, the CPU 32 displays a transmission selection screen SC1 on the display unit 14. The transmission selection screen SC1 is a screen for enabling the user to select whether or not to transmit the acquisition target information, in response to the GET request received through the Internet 6. The transmission selection screen SC1 includes a message indicating that the printer 10 is accessed from outside of the LAN 4, a 'Yes' button indicating that transmission of the acquisition target information is to be approved and a 'No' button indicating that transmission of the acquisition target information is to be disapproved. In the meantime, the transmission selection screen SC1 may further include a character string (for example, a character string 'error hysteresis', a character string 'remaining amount of disposable', and the like) indicative of the item, which is indicated by the acquisition item information in the GET request. Thereby, the user can know which information in the printer 10 is requested to be transmitted, and can determine whether to approve the transmission of the information or not, depending on the type of the information.

In S18, the CPU 32 determines whether the 'Yes' button or 'No' button is selected in the transmission selection screen SC1. When it is determined that the 'Yes' button is selected (YES in S18), the CPU 32 proceeds to S20, and when it is determined that the 'No' button is selected (NO in S18), the CPU 32 proceeds to S24.

In S20, the CPU 32 starts to count the timer. When the timer value T reaches a predetermined value Tth, the timer is reset to zero in processing different from FIG. 3. When the processing of S20 is over, the CPU 32 proceeds to S22.

In S22, the CPU 32 transmits the acquisition target information, which corresponds to the item indicated by the acquisition item information in the GET request, to the transmission source apparatus. That is, in the processing of S22 that is executed via the case where a determination result of S12 is YES, the CPU 32 transmits the acquisition target information to the relay server 50. Also, in the processing of S22 that is executed via the case where a determination result of S12 is NO, the CPU 32 transmits the acquisition target information to the user terminal 80. When the processing of S22 is over, the CPU 32 returns to S10.

Also, in S24, the CPU 32 transmits acquisition disapproval information to the relay server 50 without transmitting the acquisition target information to the relay server 50. The acquisition disapproval information is information for notifying the relay server 50 that the relay server 50 cannot acquire the acquisition target information. When the processing of S24 is over, the CPU 32 returns to S10.

Figure 4:
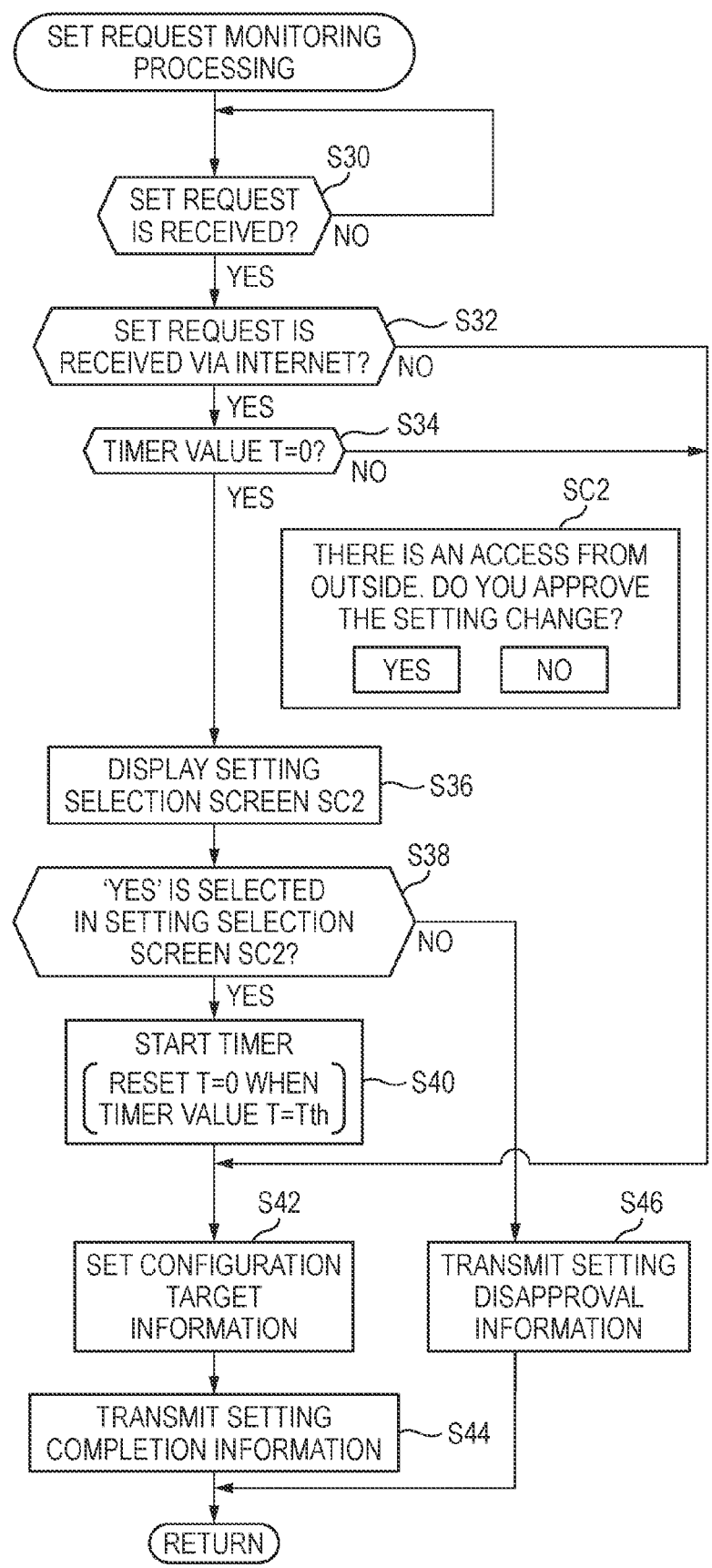
FIG. 4 is a flowchart of SET request monitoring processing.

(SET Request Monitoring Processing; FIG. 4)

Subsequently, SET request monitoring processing that is to be executed by the CPU 32 of the printer 10 is described with reference to FIG. 4. Briefly describing the SET request monitoring processing, the CPU 32 receives a SET request for setting the information into the printer 10 from the relay server 50 or the user terminal 80, and sets the information (hereinafter, referred to as 'configuration target information') in the SET request into the printer 10. In the below, an apparatus of a transmission source of the SET request is referred to as 'transmission source apparatus.' The configuration target information includes a communication setting (for example, an IP address, a subnet mask, a gateway address, and the like) of the printer 10, a default printing setting (for example, a sheet size, a printing resolution, whether or not a duplex printing, and the like), and the like.

In S30, the CPU 32 monitors whether a SET request is received from the transmission source apparatus. When a SET request is received from the transmission source apparatus (YES in S30), the CPU 32 proceeds to S32.

In S32, the CPU 32 determines whether the SET request is received from the relay server 50 through the Internet 6 or is received from the user terminal 80 without via the Internet 6. The determination of S32 is the same as the determination of S12 in FIG. 3. When it is determined that the SET request is received from the relay server 50 through the Internet 6 (YES in S32), the CPU 32 proceeds to S34, and when it is determined that the SET request is received from the user terminal 80 without via the Internet 6 (NO in S32), the CPU 32 skips over S34 to S40 and proceeds to S42.

In S34, the CPU 32 determines whether a timer value T is zero or not. The corresponding timer is different from the timer configured to start the count in S20 of FIG. 3. The corresponding timer is a timer configured to start a count in S40 (which will be described later), and more specifically, a timer configured to count a predetermined time period after 'Yes' is selected in a setting selection screen. When it is determined that the timer value T is zero (YES in S34), the CPU 32 proceeds to S36, and when it is determined that the timer value T is not zero (NO in S34), the CPU 32 skips over S36 to S40 and proceeds to S42.

In S36, the CPU 32 displays a setting selection screen SC2 on the display unit 14. The setting selection screen SC2 is a screen for enabling the user to select whether or not to set the configuration target information, in response to the request received through the Internet 6. The setting selection screen SC2 includes a message indicating that the printer 10 is accessed from outside of the LAN 4, a 'Yes' button indicating that setting of the configuration target information is to be approved and a 'No' button indicating that setting of the configuration target information is to be disapproved.

In S38, the CPU 32 determines whether the 'Yes' button or 'No' button is selected in the setting selection screen SC2. When it is determined that the 'Yes' button is selected (YES in S38), the CPU 32 proceeds to S40, and when it is determined that the 'No' button is selected (NO in S38), the CPU 32 proceeds to S46.

In S40, the CPU 32 starts to count the timer. When the timer value T reaches a predetermined value Tth, the timer is reset to zero in processing different from FIG. 4. When the processing of S40 is over, the CPU 32 proceeds to S42.

In S42, the CPU 32 sets the configuration target information requested by the SET request, i.e., the configuration target information in the SET request into the printer 10. That is, the printer 10 registers the configuration target information (for example, a new IP address) in the SET request into the memory 34, instead of the information (for example, an IP address) set in the memory 34 of the printer 10 upon the reception of the SET request. That is, the CPU 32 changes the setting. When the processing of S42 is over, the CPU 32 proceeds to S44.

In S44, the CPU 32 transmits setting completion information to the transmission source apparatus. That is, in step of S44 that is executed via the case where a determination result of S32 is YES, the CPU 32 transmits the setting completion information to the relay server 50. Also, in the processing of S44 that is executed via the case where a determination result of S32 is NO, the CPU 32 transmits setting completion information to the user terminal 80. The setting completion information is information for notifying the transmission source apparatus that the setting of the configuration target information has been completed. When the processing of S44 is over, the CPU 32 returns to S30.

Also, in S46, the CPU 32 transmits setting disapproval information to the relay server 50 without setting the configuration target information into the printer 10. The setting disapproval information is information for notifying the relay server 50 that the configuration target information is not to be set. When the processing of S46 is over, the CPU 32 returns to S30.

(Case where Acquisition Target Information is to be Transmitted in Response to GET Request; FIGS. 5A-5B)

Specific cases that are to be implemented by the respective processing of FIGS. 3 and 4 are described with reference to FIGS. 5 to 7. First, a case where the acquisition target information is to be transmitted in response to the GET request is described with reference to FIG. 5. Meanwhile, in the respective cases of FIGS. 5 to 7, before an instruction is transmitted from the service terminal 110 to the service server 100, i.e., before an instruction is transmitted from the service server 100 to the relay server 50, the XMPP connection is established between the relay server 50 and the printer 10 (refer to T36 of FIG. 2).

In T50, the service terminal 110 transmits an instruction for transmission of a GET request to the service server 100, in response to an instruction from the operator of the call center. In the meantime, before the instruction is transmitted to the service server 100, the operator asks the user of the printer 10 who is an opposite call party about the user account AC (refer to FIG. 2) and the service terminal 110 establishes a login state where the service terminal 110 logs in the service server 100, by using the user account AC. The service terminal 110 transmits an instruction for transmission of a GET request to the service server 100 by using the login state. The instruction includes the acquisition item information.

When the instruction for transmission of a GET request is received from the service terminal 110, the service server 100 acquires a token TK (i.e., the token TK (refer to T16 of FIG. 2) associated with the user account AC) corresponding to the login state. In T52, the service server 100 transmits an instruction (i.e., the instruction for transmission of a GET request), which includes the acquired token TK and the acquisition item information in the instruction of T50, to the relay server 50.

When the instruction for transmission of a GET request is received from the service server 100, the CPU 72 of the relay server 50 executes the authentication for the token TK in the instruction. Incidentally, in the below, instead of the description 'the CPU 72 of the relay server 50 . . . ,' the description 'the relay server 50 . . . ' is simply made. If the token TK is stored in the memory 74, the relay server 50 determines that the authentication for the token TK is successful. If the token TK is not stored in the memory 74, the relay server 50 determines that the authentication for the token TK fails and does not execute subsequent processing. In the case of FIG. 5, since the authentication for the token TK is successful (refer to T34 of FIG. 2), in T54, the relay server 50 transmits a GET request conforming to the XMPP to the printer 10 by using the XMPP connection with the printer 10 identified by the printer information PI (refer to T34 of FIG. 2) associated with the token TK. The GET request includes the user ID in the user account AC (refer to T34 of FIG. 2) associated with the token TK and the acquisition item information in the instruction of T52. As described above, the GET request that is to be transmitted from the relay server 50 to the printer 10 is transmitted from the relay server 50 without the relay server 50 receiving an instruction from the printer 10. That is, the relay server 50 receives an instruction for transmission of a request from the service server 100, not the printer 10. This is also the same in FIGS. 6 to 8 (which will be described later).

In T60, when the GET request is received from the relay server 50, the CPU 32 of the printer 10 determines that the GET request is received from the relay server 50 through the Internet 6 (YES in S12 of FIG. 3). Meanwhile, in the below, instead of the description 'the CPU 32 of the printer 10 . . . ,' the description 'the printer 10 . . . ' is simply made. In T62, the printer 10 displays the transmission selection screen SC1 (refer to FIG. 3) (S16). In T64, the 'Yes' button in the transmission selection screen SC1 is selected by the user (YES in S18). In T66, the printer 10 starts to count the timer (S20). In T68, the printer 10 transmits the acquisition target information, which corresponds to an item indicated by the acquisition item information in the GET request, to the relay server 50 (S22).

When the acquisition target information is received from the printer 10, the relay server 50 transmits the acquisition target information to the service server 100, in T70. When the acquisition target information is received from the relay server 50, the service server 100 transmits the acquisition target information to the service terminal 110, in T72. When the acquisition target information is received from the service server 100, the service terminal 110 displays the acquisition target information, in T74. Thereby, the operator of the call center can know about the information in the printer 10 by seeing the acquisition target information displayed on the service terminal 110.

The relay server 50 is provided on the Internet 6 and is not provided by the manager of the LAN 4. For this reason, when the printer 10 receives the GET request from the relay server 50 through the Internet 6, it is not clear whether the transmission source apparatus (i.e., the relay server 50) of the GET request is an apparatus having high reliability. Therefore, in this illustrative embodiment, when the GET request is received from the relay server 50, the printer 10 displays the transmission selection screen SC1 (T62). The user is making a call with the operator of the call center and the operator notifies the user that the operator wants to see the information in the printer 10. Therefore, the user determines that there is no problem even if the user selects the 'Yes' button in the transmission selection screen SC1, and thus selects the 'Yes' button in the transmission selection screen SC1 (T64). In this case, the printer 10 transmits the acquisition target information to the relay server 50 (T68). In this way, when the transmission of the acquisition target information is approved by the user, the printer 10 can appropriately transmit the acquisition target information to the relay server 50.

In this illustrative embodiment, a situation is assumed where the GET request is transmitted to the printer 10 several times. In T80, the service terminal 110 transmits the instruction for transmission of a GET request to the service server 100. As a result, like T52 and T54, in T82, the instruction is transmitted from the service server 100 to the relay server 50, and in T84, the GET request is transmitted from the relay server 50 to the printer 10.

When the GET request is again received from the relay server 50, the printer 10 determines that the timer value T is not zero (NO in S14 of FIG. 3) because the value T of the timer having started the count in T66 is smaller than the predetermined value Tth and the count of the timer continues. For this reason, in T86, the printer 10 transmits the acquisition target information to the relay server 50 (S22) without displaying the transmission selection screen SC1 (i.e., without executing the processing of S16). The processing of T88 to T94 is the same as the processing of T68 to T74.

As described above, when the GET request is again received from the relay server 50 after the user selects the 'Yes' button in the transmission selection screen SC1 until a predetermined time period elapses, the printer 10 does not again display the transmission selection screen SC1. The reason is that there is a high possibility that the user will again select the 'Yes' button even if the transmission selection screen SC1 is again displayed. Since the user does not have to again make a selection through the transmission selection screen SC1, the user's convenience is improved.

FIG. 5 depicts a case where the GET request is transmitted from the user terminal 80 to the printer 10, too. In T100, the user inputs the instruction for transmission of a GET request into the user terminal 80. In T102, when the instruction is received from the user, the user terminal 80 transmits the GET request including the acquisition item information to the printer 10 without via the Internet 6. The GET request is a command conforming to a protocol different from the XMPP. In the case of FIG. 5, the GET request is a command conforming to the SNMP or HTTP. Also, the GET request does not include the user ID, unlike the GET request of T54.

When the GET request is received from the user terminal 80, the printer 10 determines that the GET request is received from the user terminal 80 without via the Internet 6 (NO in S12 of FIG. 3). In the meantime, when the GET request of T102 is a GET request conforming to the SNMP, the printer 10 can receive the GET request conforming to the SNMP from the user terminal 80 without establishing the connection with the user terminal 80. On the other hand, when the GET request of T102 is a GET request conforming to the HTTP, after the instruction of T100 is provided to the user terminal 80, the printer 10 receives a request for establishment of the HTTP connection from the user terminal 80 and then establishes the HTTP connection with the user terminal 80. Then, the printer 10 receives a GET request conforming to the HTTP by using the HTTP connection. In any case, the printer 10 can receive the GET request from the user terminal 80 even when the connection with the user terminal 80 is not established in advance before the instruction of T100 is provided to the user terminal 80.

In T104, the printer 10 transmits the acquisition target information, which corresponds to the item indicated by the acquisition item information in the GET request, to the user terminal 80 without displaying the transmission selection screen SC1 (S22 that is executed via the case where a determination result of S12 of FIG. 3 is NO). In T108, the user terminal 80 displays the acquisition target information. Thereby, the user can know about the information in the printer 10 by seeing the acquisition target information displayed on the user terminal 80.

Since the user terminal 80 provided in the LAN 4 by the manager of the LAN 4 is an apparatus having high reliability, there is no problem even if the information in the printer 10 is transmitted to the user terminal 80. For this reason, in this illustrative embodiment, when the GET request is received from the user terminal 80 without via the Internet 6, the printer 10 transmits the acquisition target information to the user terminal 80 without displaying the transmission selection screen SC1 (T104). In this way, since the user does not have to make a selection through the transmission selection screen SC1, the user's convenience is improved.

(Case where Configuration Target Information is to be Set in Response to SET Request; FIGS. 6A-6B)

Subsequently, a case where the configuration target information is to be set in the printer 10 in response to the SET request is described with reference to FIG. 6.

In T130, the service terminal 110 transmits an instruction for transmission of a SET request to the service server 100, in response to an instruction from the operator of the call center. The instruction includes the configuration target information. In the meantime, the service terminal 110 establishes a login state where the service terminal 110 logs in the service server 100, which is the same as T50 of FIG. 5.

When the instruction for transmission of a SET request is received from the service terminal 110, the service server 100 acquires the token TK corresponding to the login state. In T132, the service server 100 transmits the instruction (i.e., the instruction for transmission of a SET request), which includes the acquired token TK and the configuration target information in the instruction of T130, to the relay server 50.

When the instruction for transmission of a SET request is received from the service server 100, the relay server 50 determines that the authentication for the token TK in the instruction is successful, and transmits a SET request conforming to the XMPP to the printer 10 by using the XMPP connection with the printer 10, in T134. The SET request includes the user ID in the user account AC associated with the token TK and the configuration target information in the instruction of T132.

In T140, when the SET request is received from the relay server 50, the printer 10 determines that the SET request is received from the relay server 50 through the Internet 6 (YES in S32 of FIG. 4). In T142, the printer 10 displays the setting selection screen SC2 (refer to FIG. 4) (S36). In T144, the 'Yes' button in the setting selection screen SC2 is selected by the user (YES in S38). In T146, the printer 10 starts to count the timer (S40). In T147, the printer 10 sets the configuration target information in the SET request into the printer 10 (S42). In T148, the printer 10 transmits the setting completion information to the relay server 50 (S44).

In T150, the setting completion information is transmitted from the relay server 50 to the service server 100, and in T152, the setting completion information is transmitted from the service server 100 to the service terminal 110. In T154, the service terminal 110 displays the setting completion information. Thereby, the operator of the call center can know that the information setting into the printer 10 has been completed by seeing the setting completion information displayed on the service terminal 110.

As described above, when the SET request is received from the relay server 50, the printer 10 displays the setting selection screen SC2 (T142). The user is making a call with the operator of the call center, and the operator notifies the user that the operator wants to set the information into the printer 10. Therefore, the user determines that there is no problem even if the user selects the 'Yes' button in the setting selection screen SC2, and thus selects the 'Yes' button in the setting selection screen SC2 (T144). In this case, the printer 10 sets the configuration target information into the printer 10 (T68). In this way, when the setting of the configuration target information is approved by the user, the printer 10 can appropriately set the configuration target information into the printer 10.

In this illustrative embodiment, a situation is assumed where the SET request is transmitted to the printer 10 several times. In T160, the service terminal 110 transmits the instruction for transmission of a SET request to the service server 100. As a result, like T132 and T134, in T162, the instruction is transmitted from the service server 100 to the relay server 50, and in T164, the SET request is transmitted from the relay server 50 to the printer 10.

When the SET request is again received from the relay server 50, the printer 10 determines that the value T of the timer having started the count in T146 is not zero (NO in S34 of FIG. 4). For this reason, in T167, the printer 10 sets the configuration target information into the printer 10 (S42) without displaying the setting selection screen SC2 (i.e., without executing the processing of S36). The processing of T168 to T174 is the same as the processing of T148 to T154.

As described above, when the SET request is again received from the relay server 50 after the user selects the 'Yes' button in the setting selection screen SC2 until a predetermined time period elapses, the printer 10 does not again display the setting selection screen SC2. The reason is that there is a high possibility that the user will again select the 'Yes' button even if the setting selection screen SC2 is again displayed. Since the user does not have to again make a selection through the setting selection screen SC2, the user's convenience is improved.

FIG. 6 depicts a case where the SET request is to be transmitted from the user terminal 80 to the printer 10, too. The processing of T180 to T182 of FIG. 6 is the same as the processing of T100 to T102 of FIG. 5, except that the instruction of T100 of FIG. 5 is replaced with the instruction for transmission of a SET request and the GET request of T102 of FIG. 5 is replaced with the SET request.

When the SET request is received from the user terminal 80, the printer 10 determines that the SET request is received from the user terminal 80 without through the Internet 6 (NO in S32 of FIG. 4). In the meantime, like the GET request, the printer 10 can receive the SET request from the user terminal 80 even when the connection with the user terminal 80 is not established in advance before the instruction of T180 is provided to the user terminal 80. In T184, the printer 10 sets the configuration target information in the SET request into the printer 10 without displaying the setting selection screen SC2 (S42 that is executed via the case where a determination result of S32 is NO). Then, in T186, the printer 1 transmits the setting completion information to the user terminal 80 (S44). Thereby, in T188, the user terminal 80 displays the setting completion information. The user can know that the information has been set into the printer 10 by seeing the setting completion information displayed on the user terminal 80.

Since the user terminal 80 is an apparatus having high reliability, there is no problem even if the information is set into the printer 10 in response to the SET request received from the user terminal 80. For this reason, in this illustrative embodiment, when the SET request is received from the user terminal 80 without via the Internet 6, the printer 10 sets the configuration target information into the printer 10 without displaying the setting selection screen SC2. In this way, since the user does not have to make a selection through the setting selection screen SC2, the user's convenience is improved.

(Case where not to Respond to GET Request; FIGS. 7A-7B)

Subsequently, a case where the printer 10 does not transmit the acquisition target information in response to the GET request is described with reference to FIG. 7. The processing of T200 to T212 is the same as the processing of T50 to T62 FIG. 5. In T214, the 'No' button in the transmission selection screen SC1 is selected by the user (No in S18 of FIG. 3). In this case, the printer 10 transmits the acquisition disapproval information to the relay server 50 in T218, without transmitting the acquisition target information (S24). Thereby, in T220 and T222, the acquisition disapproval information is transmitted from the relay server 50 to the service terminal 110 through the service server 100. As a result, in T224, the service terminal 110 displays the acquisition disapproval information. The operator of the call center can know that the transmission of the acquisition target information is disapproved by the user by seeing the acquisition disapproval information displayed on the service terminal 110.

In this illustrative embodiment, when the GET request is received from the relay server 50 through the Internet 6, the printer 10 displays the transmission selection screen SC1 (T212). For example, a user who is highly conscious about the security may disapprove the transmission of the information in the printer 10 to the Internet 6 even if the user makes a call with the operator of the call center. In this situation, the user may select the 'No' button in the transmission selection screen SC1 (T214), so that the printer 10 does not transmit the acquisition target information to the relay server 50. Also, for example, a situation where a third party illegally accesses the relay server 50 by using a terminal of the third party and transmits an instruction for transmitting a GET request to the relay server 50 may be considered. Also in this situation, the printer 10 can receive the GET request from the relay server 50 through the Internet 6. In this case, since the printer 10 displays the transmission selection screen SC1 (T212), the user can select 'No' button in the transmission selection screen SC1 (T214), so that the printer 10 does not transmit the acquisition target information to the relay server 50. In this way, when the user does not want the transmission of the acquisition target information, the acquisition target information is not transmitted to the relay server 50, so that the security of the printer 10 can be improved.

(Case where not to Respond to SET Request; FIG. 7)

FIG. 7 depicts a case where the printer 10 does not set the configuration target information in response to the SET request, too. The processing of T230 to T242 is the same as the processing of T130 to T142 of FIG. 6. In T244, the 'No' button in the setting selection screen SC2 is selected by the user (NO in S38 of FIG. 4). In this case, the printer 10 transmits the setting disapproval information to the relay server 50 in T248, without setting the configuration target information into the printer 10 (S46). Thereby, in T250 and T252, the setting disapproval information is transmitted from the relay server 50 to the service terminal 110 through the service server 100. As a result, in T254, the service terminal 110 displays the setting disapproval information. The operator of the call center can know that the setting of the configuration target information is disapproved by the user, by seeing the setting disapproval information displayed on the service terminal 110.

In this illustrative embodiment, when the SET request is received from the relay server 50, the printer 10 displays the setting selection screen SC2 (T242). For example, a user who is highly conscious about the security may disapprove the setting of the information, which is to be acquired from the Internet 6, into the printer 6 even if the user makes a call with the operator of the call center. In this situation, the user may select the 'No' button in the setting selection screen SC2 (T244), so that the printer 10 does not set the configuration target information into the printer 10. Also, for example, in a situation where the printer 10 receives the SET request from the relay server 50 as a result of the illegal access of the third party, the user can select the 'No' button in the setting selection screen SC2 (T244), so that the printer 10 does not set the configuration target information into the printer 10. In this way, when the user does not want the setting of the configuration target information, the configuration target information is not set into the printer 10, so that the security of the printer 10 can be improved.

The printer 10, the relay server 50 and the user terminal 80 are examples of the 'communication apparatus', the 'server apparatus' and the 'terminal apparatus', respectively. The GET request or the SET request is an example of the 'first request.' When the GET request is an example of the 'first request,' the SET request is an example of the 'second request.' The XMPP connection is an example of the 'connection.' The XMPP and SNMP (or HTTP) are examples of the 'first communication protocol' and the 'second communication protocol', respectively.

<Modification to First Illustrative Embodiment>

As described in T54 and T102 of FIG. 5, the GET request (refer to T54) received from the relay server 50 includes the user ID in the user account AC, and the GET request (refer to T102) received from the user terminal 80 does not include the user ID. Therefore, in S12 of FIG. 3, the CPU 32 of the printer 10 may be configured to determine whether the GET request received in S10 includes the user ID. That is, when the GET request received in S10 includes the user ID, the CPU 32 may determine that the GET request is received from the relay server 50 through the Internet 6, and when the GET request received in S10 does not include the user ID, the CPU 32 may determine that the GET request is received from the user terminal 80 without via the Internet 6. Also in the determination of S32 in FIG. 4, the CPU 32 may be configured to determine whether the SET request received in S30 includes the user ID. In this modified embodiment, the user ID in the user account AC is an example of the 'user information.'

Second Illustrative Embodiment

In this illustrative embodiment, the GET request monitoring processing of FIG. 3 is different from the first illustrative embodiment. The others (for example, the SET request monitoring processing of FIG. 4) are the same as the first illustrative embodiment. In FIG. 3, as shown with the dashed-dotted line extending from S10, when the GET request is received (YES in S10), the CPU 32 of the printer 10 of this illustrative embodiment does not display the transmission selection screen SC1 and transmits the acquisition target information to the transmission source apparatus in S110, irrespective of whether the GET request is received from the relay server 50 through the Internet 6 or is received from the user terminal 80 without via the Internet 6.

Figure 8:
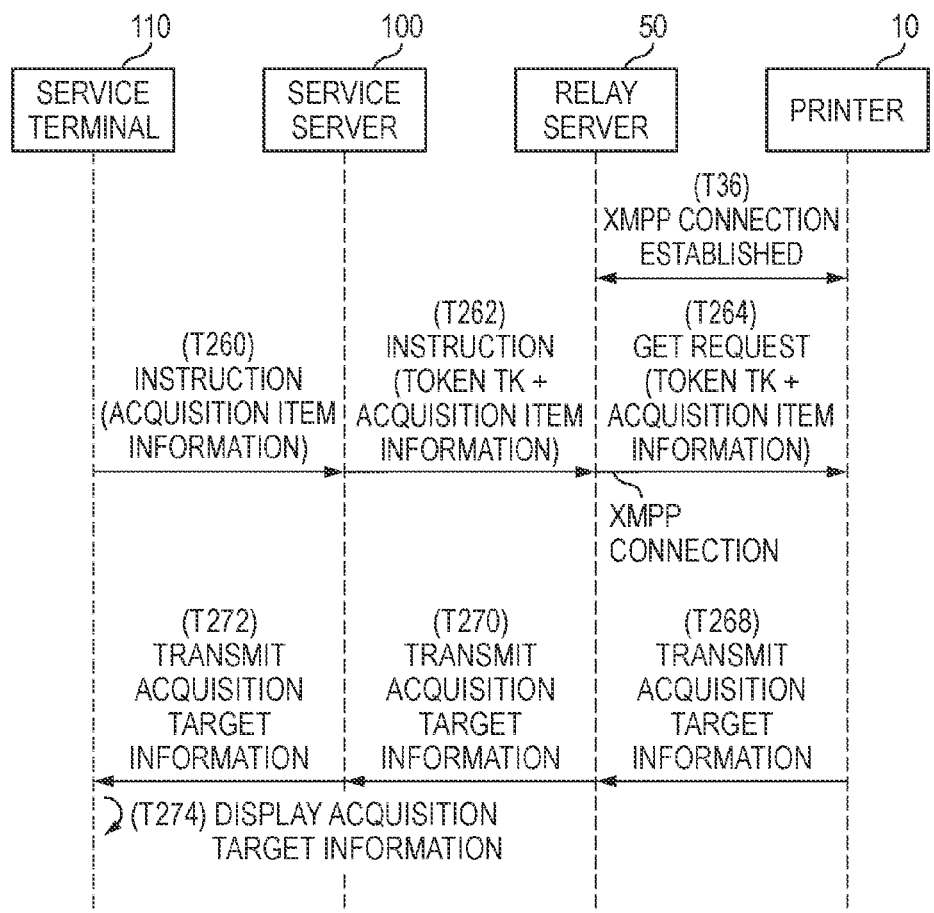
FIG. 8 depicts a case of a second illustrative embodiment where the acquisition target information is transmitted in response to the GET request.

(Case where Acquisition Target Information is to be Transmitted in Response to GET Request; FIG. 8)

The processing of T260 to T264 of FIG. 8 is the same as the processing of T50 to T54 of FIG. 5. When the GET request is received from the relay server 50, the printer 10 transmits the acquisition target information to the relay server 50 in T268, without displaying the transmission selection screen SC1 (S110). The processing of T270 to T274 is the same as the processing of T70 to T74 of FIG. 5.

In this illustrative embodiment, an idea that even when the information in the printer 10 is transmitted to the outside through the Internet 6, the security of the printer 10 is little lowered is adopted. For this reason, even when the GET request is received from the relay server 50, the printer 10 transmits the acquisition target information to the relay server 50 without displaying the transmission selection screen SC1 (T268). Since the user does not have to make a selection through the transmission selection screen SC1, the user's convenience is improved. Also, in this illustrative embodiment, like the first illustrative embodiment, an idea that when the information received through the Internet 6 is automatically set into the printer 10 without the user's approval, the security of the printer 10 may be lowered is adopted. For example, the third party sets the illegal information into the printer 10, so that the user cannot use the printer 10. For this reason, when the SET request is received from the relay server 50, the printer 10 displays the setting selection screen SC2, like the first illustrative embodiment. Thereby, it is possible to improve the security of the printer 10. In this illustrative embodiment, the SET request and the GET request are examples of the 'first request' and the 'second request', respectively. The other correspondence relations are the same as the first illustrative embodiment.

Although the specific embodiments of the disclosure have been described in detail, the embodiments are just exemplary, not to limit the claims. The technology defined in the claims includes a variety of changes and modifications to the above specific embodiments. Modified embodiments of the illustrative embodiments are described in the below.

Modified Embodiment 1

In the respective illustrative embodiments, the relay server 50 receives the instruction for transmission of a GET request or a SET request from the service server 100 provided in the call center of the vendor of the printer 10. Instead of this configuration, the relay server 50 may receive the instruction for transmission of a GET request or a SET request from other service server that is provided by the vendor of the printer 10 or a business provider different from the vendor. As an example of the other service server, a server configured to provide a service of supplying image data for print to the printer 10 may be exemplified. As another example, a server configured to provide a service of dispatching a new disposable to the user of the printer 10 when the remaining amount of the disposable of the printer 10 is equal to or less than a predetermined value may be exemplified.

Modified Embodiment 2

The 'communication apparatus' is not limited to the printer 10, and all apparatuses (for example, a scanner, a multi-functional apparatus, a FAX apparatus, a telephone apparatus, a PC, a smart phone and the like) capable of executing a communication function can also be adopted.

Modified Embodiment 3

The processing of S14 and S20 of FIG. 3 may be omitted. That is, when the first request is again received from the server apparatus before a predetermined time period elapses after the user selects the transmission of the acquisition target information through the transmission selection screen, the transmission selection screen may be again displayed. Also, the processing of S34 and S40 of FIG. 4 may be omitted. That is, when the first request is again received from the server apparatus before a predetermined time period elapses after the user selects the setting of the configuration target information through the setting selection screen, the setting selection screen may be again displayed.

Modified Embodiment 4

In the illustrative embodiments, the CPU 32 of the printer 10 executes the processing in response to the program 36, so that the respective processing of FIGS. 2 to 8 is implemented. Instead of this configuration, at least one of the respective processing may be implemented by the hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A communication apparatus comprising:
a display;
a processor; and
a memory storing instructions which, when executed by the processor, cause the communication apparatus to perform:
receiving a first request for acquiring acquisition target information, the acquisition target information included in the communication apparatus;
determining whether the first request is received from a server apparatus outside of a local area network, to which the communication apparatus belongs, or a terminal apparatus belonging to the local area network;
controlling the display to display a transmission selection screen for receiving a user's selection whether or not to transmit the acquisition target information, when it is determined that the first request is received from the server apparatus;
controlling the display not to display the transmission selection screen, when it is determined that the first request is received from the terminal apparatus;
transmitting the acquisition target information to the server apparatus, in response to receiving the user's selection to transmit the acquisition target information through the transmission selection screen when it is determined that the first request is received from the server apparatus;
not transmitting the acquisition target information to the server apparatus, in response to receiving the user's selection not to transmit the acquisition target information through the transmission selection screen when it is determined that the first request is received from the server apparatus; and
transmitting the acquisition target information to the terminal apparatus, when it is determined that the first request is received from the terminal apparatus.

2. The communication apparatus according to claim 1, wherein the memory further stores instructions, when executed by the computer, causing the communication apparatus to perform:
receiving a second request for setting configuration target information into the communication apparatus;
determining whether the second request is received from the server apparatus or the terminal apparatus;
controlling the display to display a setting selection screen for receiving a user's selection whether or not to set the configuration target information, when it is determined that the second request is received from the server apparatus;
controlling the display not to display the setting selection screen, when it is determined that the second request is received from the terminal apparatus;
setting the configuration target information into the communication apparatus, in response to receiving the user's selection to set the configuration target information through the setting selection screen when it is determined that the second request is received from the server apparatus;
not setting the configuration target information into the communication apparatus, in response to receiving the user's selection not to set the configuration target information through the setting selection screen when it is determined that the second request is received from the server apparatus; and
setting the configuration target information into the communication apparatus, when it is determined that the second request is received from the terminal apparatus.

3. The communication apparatus according to claim 1, wherein when the first request is again received from the server apparatus before a predetermined time period elapses after receiving the user's selection to transmit the acquisition target information through the transmission selection screen, the instructions cause the communication apparatus to perform:
controlling the display not to display the transmission selection screen; and
transmitting the acquisition target information to the server apparatus.

4. The communication apparatus according to claim 1, wherein the memory further stores instructions, when executed by the computer, causing the communication apparatus to perform:
establishing a connection between the communication apparatus and the server apparatus before the server apparatus receives an instruction for transmitting the first request to the communication apparatus;
not establishing a connection between the communication apparatus and the terminal apparatus before the terminal apparatus receives an instruction for transmitting the first request to the communication apparatus; and
receiving the first request from the server apparatus by using the established connection when an apparatus which transmits the first request is the server apparatus.

5. The communication apparatus according to claim 1, wherein the memory further stores instructions, when executed by the computer, causing the communication apparatus to perform:
determining a type of a communication protocol of the first request, in response to receiving the first request;
determining that the first request is received from the server apparatus, when it is determined that the first request conforms to a first communication protocol; and
determining that the first request is received from the terminal apparatus, when it is determined that the first request conforms to a second communication protocol that is different from the first communication protocol.

6. The communication apparatus according to claim 5, wherein the memory further stores instructions, when executed by the computer, causing the communication apparatus to perform:
establishing a connection between the communication apparatus and the server apparatus before the server apparatus receives an instruction for transmitting the first request to the communication apparatus, the connection being for executing communication conforming for eXtensive Messaging and Presence Protocol (XMPP),
wherein the first communication protocol is the XMPP, and
wherein the second communication protocol is one of Hyper Text Transfer Protocol (HTTP) and Simple Network Management Protocol (SNMP).

7. The communication apparatus according to claim 1, wherein the memory further stores instructions, when executed by the computer, causing the communication apparatus to perform:
determining content of the first request, in response to receiving the first request;
determining that the first request is received from the server apparatus, when it is determined that the first request includes user information; and
determining that the first request is received from the terminal apparatus, when it is determined that the first request does not include, the user information, and wherein the user information is information that is to be registered in the server apparatus for using the server apparatus.

8. A communication apparatus comprising:
a display;
a processor; and
a memory storing instructions which, when executed by the processor, causes the communication apparatus to perform operations comprising:
receiving a first request for setting configuration target information into the communication apparatus;
determining whether the first request is received from a server apparatus outside of a local area network, to which the communication apparatus belongs, or a terminal apparatus belonging to the local area network;
controlling the display to display a setting selection screen for receiving a user's selection whether or not to set the configuration target information, when it is determined that the first request is received from the server apparatus;
controlling the display not to display the setting selection screen, when it is determined that the first request is received from the terminal apparatus;
setting the configuration target information into the communication apparatus, in response to receiving the user's selection to set the configuration target information through the setting selection screen when it is determined that the first request is received from the server apparatus;
not setting the configuration target information into the communication apparatus, in response to receiving the user's selection not to set the configuration target information through the setting selection screen when it is determined that the first request is received from the server apparatus; and
setting the configuration target information into the communication apparatus, when it is determined that the first request is received from the terminal apparatus.

9. The communication apparatus according to claim 8, wherein the operations further comprise:
receiving a second request for acquiring acquisition target information in the communication apparatus; and
transmitting the acquisition target information to an apparatus which transmits the second request without controlling the display to display a transmission selection screen for receiving a user's selection whether or not to transmit the acquisition target information, irrespective of whether the second request is received from the server apparatus or the terminal apparatus.

10. The communication apparatus according to claim 8, wherein when the first request is again received from the server apparatus before a predetermined time period elapses after receiving the user's selection to set the configuration target information through the transmission selection screen, the operations comprise:
controlling the display not to display the setting selection screen; and
setting the configuration target information into the communication apparatus.

11. The communication apparatus according to claim 8, wherein the memory further stores instructions, when executed by the computer, causing the communication apparatus to perform:
establishing a connection between the communication apparatus and the server apparatus before the server apparatus receives an instruction for transmitting the first request to the communication apparatus;

not establishing a connection between the communication apparatus and the terminal apparatus before the terminal apparatus receives an instruction for transmitting the first request to the communication apparatus; and receiving the first request from the server apparatus by using the established connection when an apparatus which transmits the first request is the server apparatus.

12. The communication apparatus according to claim 8, wherein the memory further stores instructions, when executed by the computer, causing the communication apparatus to perform:

determining a type of a communication protocol of the first request, in response to receiving the first request;

determining that the first request is received from the server apparatus, when it is determined that the first request conforms to a first communication protocol; and determining that the first request is received from the terminal apparatus, when it is determined that the first request conforms to a second communication protocol that is different from the first communication protocol.

13. The communication apparatus according to claim 12, wherein the memory further stores instructions, when executed by the computer, causing the communication apparatus to perform:

establishing a connection between the communication apparatus and the server apparatus before the server apparatus receives an instruction for transmitting the first request to the communication apparatus, the connection being for executing communication conforming for eXtensive Messaging and Presence Protocol (XMPP), wherein the first communication protocol is the XMPP, and wherein the second communication protocol is one of Hyper Text Transfer Protocol (HTTP) and Simple Network Management Protocol (SNMP).

14. The communication apparatus according to claim 8, wherein the memory further stores instructions, when executed by the computer, causing the communication apparatus to perform:

determining content of the first request, in response to receiving the first request;

determining that the first request is received from the server apparatus, when it is determined that the first request comprises user information; and determining that the first request is received from the terminal apparatus, when it is determined that the first request does not comprise the user information, and wherein the user information is information that is to be registered in the server apparatus for using the server apparatus.

\* \* \* \* \*